Sept. 12, 1967 T. E. SWEENEY ET AL 3,341,125
GROUND EFFECT MACHINE
Filed Dec. 3, 1965 3 Sheets-Sheet 1

INVENTORS
THOMAS E. SWEENEY,
WALTER B. NIXON
BY
Kane, Dalsimer, Kane & Smith
ATTORNEYS Sept. 12, 1967 T. E. SWEENEY ET AL 3,341,125
GROUND EFFECT MACHINE
Filed Dec. 3, 1965 3 Sheets-Sheet 3
FIG. 5
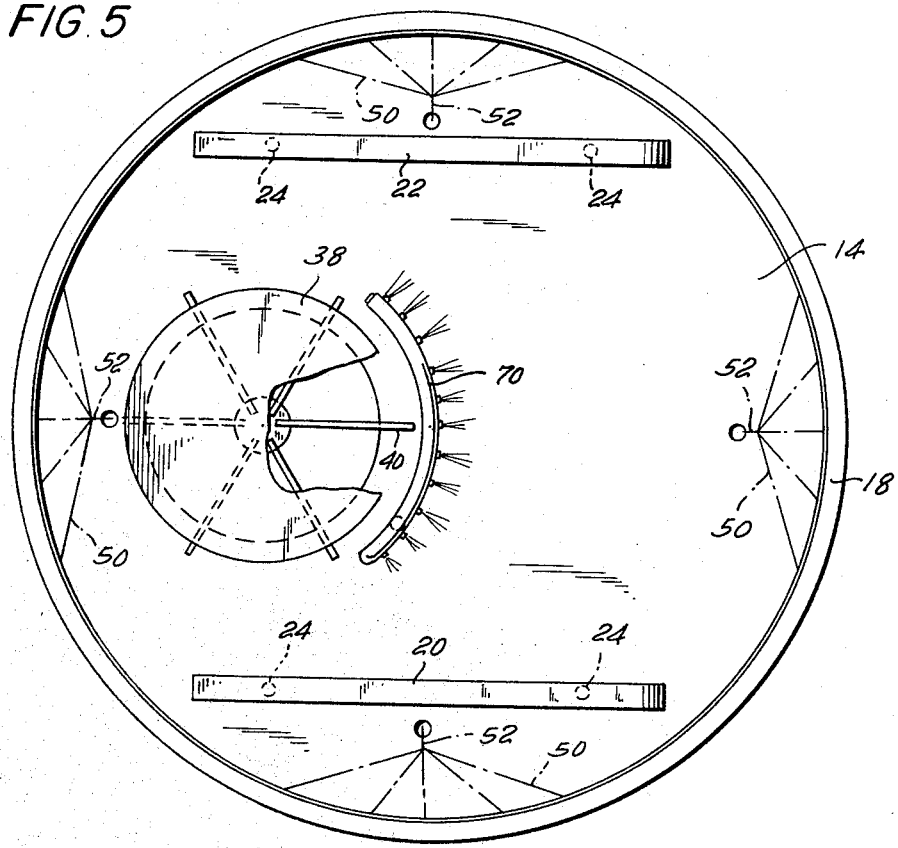
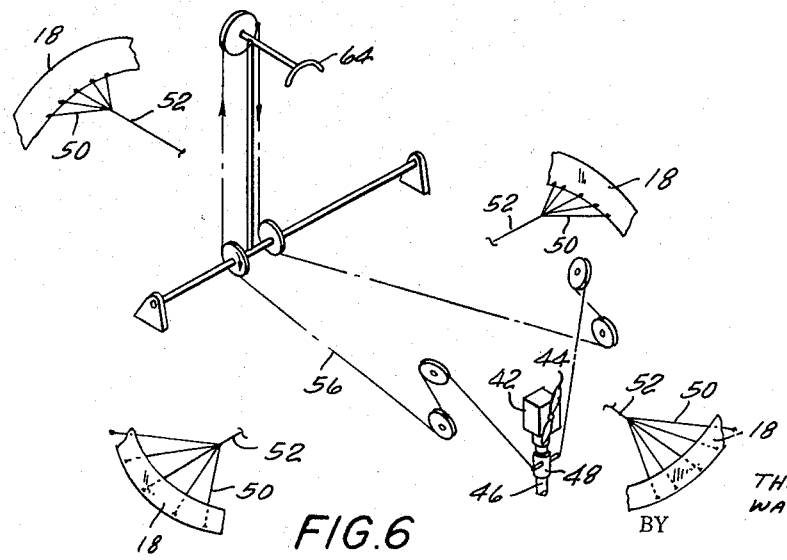
FIG. 6
INVENTORS
THOMAS E. SWEENEY
WALTER B. NIXON
BY
Kane, Dalsimer, Kane & Smith
ATTORNEYS

United States Patent Office 3,341,125
Patented Sept. 12, 1967

3,341,125
GROUND EFFECT MACHINE
Thomas E. Sweeney, Princeton, and Walter B. Nixon, Trenton, N.J., assignors to Carey Cushion Vehicle Corp., New York, N.Y., a corporation of New York
Filed Dec. 3, 1965, Ser. No. 511,890
14 Claims. (Cl. 239—8)

The present invention relates to a ground effect machine and, more particularly, to a ground effect machine peculiarly adapted to agricultural and related applications.

At present, a number of different techniques are employed in applying fertilizers, insecticides, fungicides, herbicides and the like preparations whether in liquid or powdered form to agricultural lands and crops thereon as well as uses over water for the control of insects and water borne plant life. Aside from the age-old manual techniques and horse or oxen drawn applicators, motorized land vehicles of one form or another are common in use. Included in this group are the popular tractor driven applicators. In the recent past, the use of airborne craft in the nature of light airplanes and helicopters for such tasks has increased.

In spraying or dusting applications of this type, the sprayed substances are normally dispensed or discharged above the land or crops, as the case may be. In either case, the sprayed substance will inevitably fall downwardly onto the surfaces of the particular crops or plants that are oriented upwardly. As a natural consequence of such applications, the underside of leaves and the lower part of plants will not receive the sprayed substance. Similarly, the soil below the plants may not receive the substance if this be an important consideration. In such instances, undesirable bugs, insects, fungi and the like may not receive an adequate amount or, for that matter, any of the sprayed substance.

It is, therefore, a primary object of this invention to provide an improved low-cost ground effect machine which has agricultural spraying and dusting applications without having any concern with the above noted disadvantages of prior art and conventional techniques.

Another object is to provide a ground effect machine of this type in which the downwash from the craft is gentle enough not to damage the crops while, at the same time, turbulent enough to mix the sprayed substance and apply it to the underside as well as the tops of the plants and over the entire plant and underlying soil.

A further object is to provide a ground effect machine of this type which is inherently safe, extremely maneuverable and capable of high speeds with the ability to distribute the desired concentration of the substance to be sprayed with precision and within a minimum time period over terrain possessing wide varieties of topographical configurations.

A ground effect machine, according to the present invention, is basically a unit having a rigid substantially horizontal slab and peripherally extending flexible skirt. A substantially horizontal lower deflection plate is mounted in the plenum of the craft whereupon air ingested through the inlet, having a concentrically mounted engine and fan, is adapted to be deflected and travel horizontally in a radial direction to be ultimately discharged through a downwardly facing peripheral opening part of which is defined by the flexible skirt. As is now well understood, the efflux from the peripheral opening impinges upon the ground producing a cushion pressure beneath the base of the craft which is sufficient to turn the jet efflux outwardly. The total lift of the craft is essentially the sum of the jet reaction force and the force created by the cushion pressure.

This invention advantageously utilizes this jet air flow to carry the desired substance to be sprayed. Thus, a number of liquid discharge nozzles are arranged adjacent the periphery of the horizontal deflector plate in accordance with a particular embodiment to thereby permit the substance to be advantageously picked up and carried by this air stream. This discharge nozzle assembly communicates with a suitable supply of the substance to be sprayed. This supply is conveniently mounted on the craft and, in the case of liquid material, is in the form of one or more supply tanks. A suitably rated pump may be incorporated into the system for supplementing gravitational forces to provide the desired concentration of substance per unit area. Naturally, the system will include a valve assembly for permitting the discharge of the substance when desired. In this matter, a most significant adaptation of the ground effect machine of this invention is realized in the agricultural field and in which the substance to be sprayed uniformly covers the farmland in an effective spray pattern and in substantially uniform concentrations; and where plants or foliage are the subject of the spraying operation, optimum application on the entire plant is obtained including the underside of leaves, the lowermost leaves, stems and stalks as well as the underlying soil.

Other objects and advantages will become apparent from the following detailed description which is to be taken in conjunction with the accompanying drawings illustrating a somewhat preferred embodiment of this invention and in which:

FIG. 5 is a bottom plan view thereof; and

FIG. 6 is a diagrammatic view illustrating the manner in which directivity is obtained through the manipulation of a rear thrust engine and the deflection of a peripheral flexible skirt.

Figure 1:
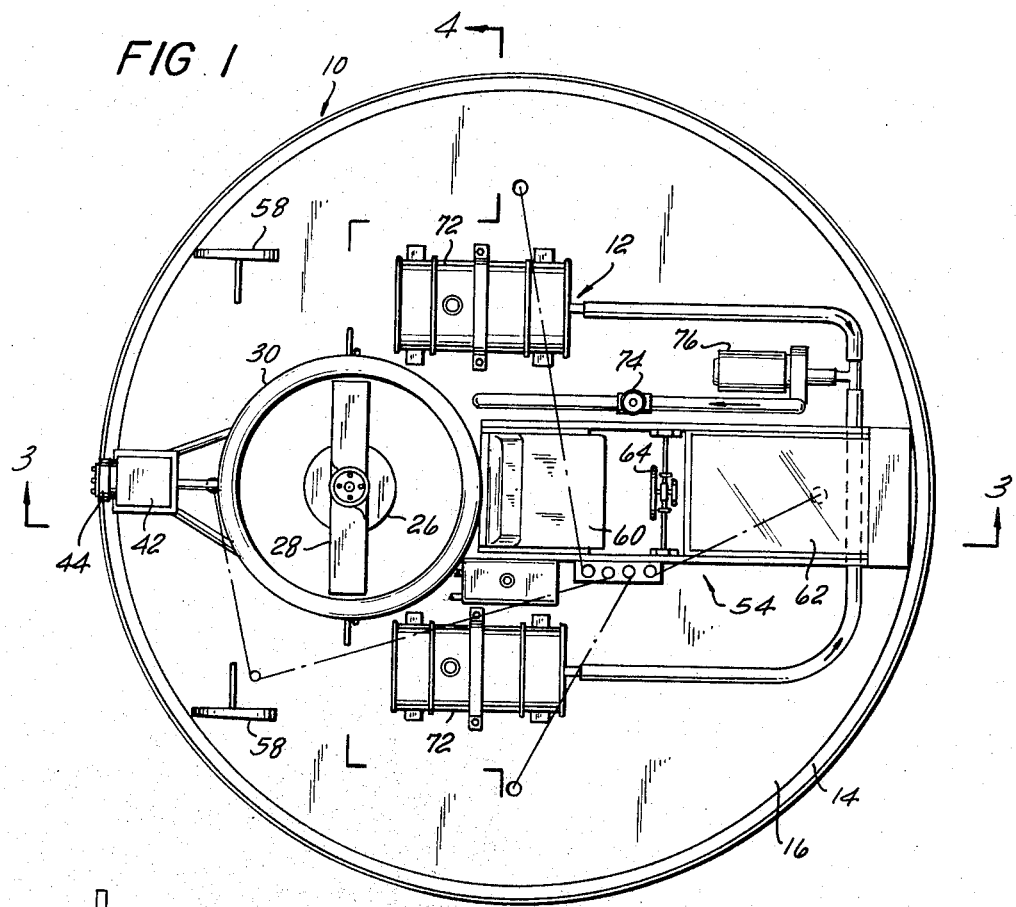
FIG. 1 is a top plan view of the ground effect machine of this invention having structurally associated therewith a liquid spraying system for carrying out the agricultural application taught herein.
Figure 2:
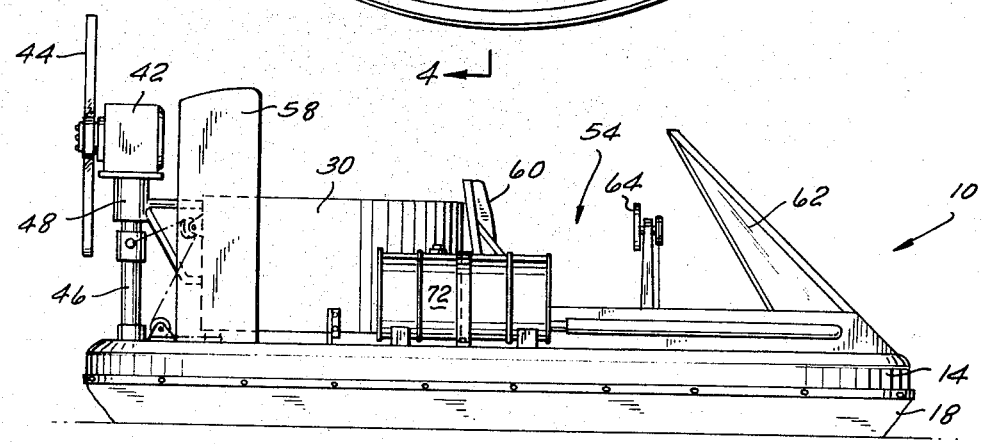
FIG. 2 is a side elevational view thereof.
Figure 3:
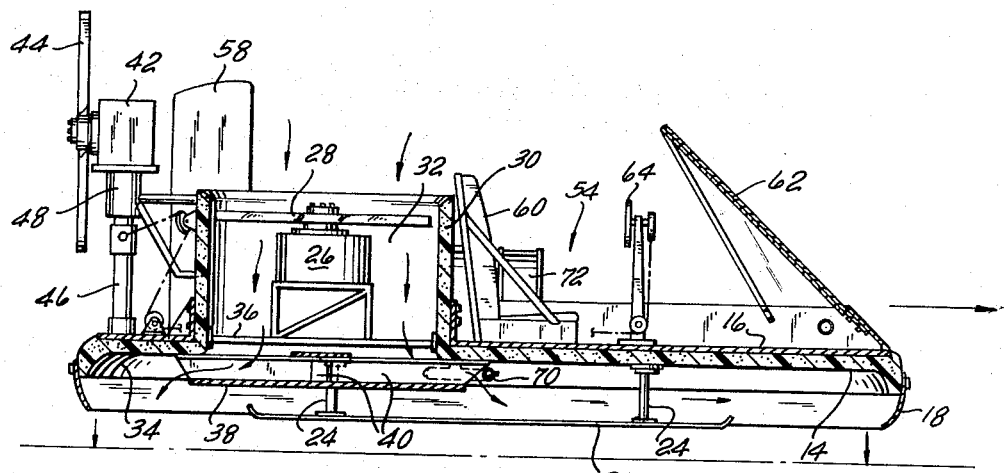
FIG. 3 is a longitudinal section taken along the line 3—3 of FIG. 1.
Figure 4:
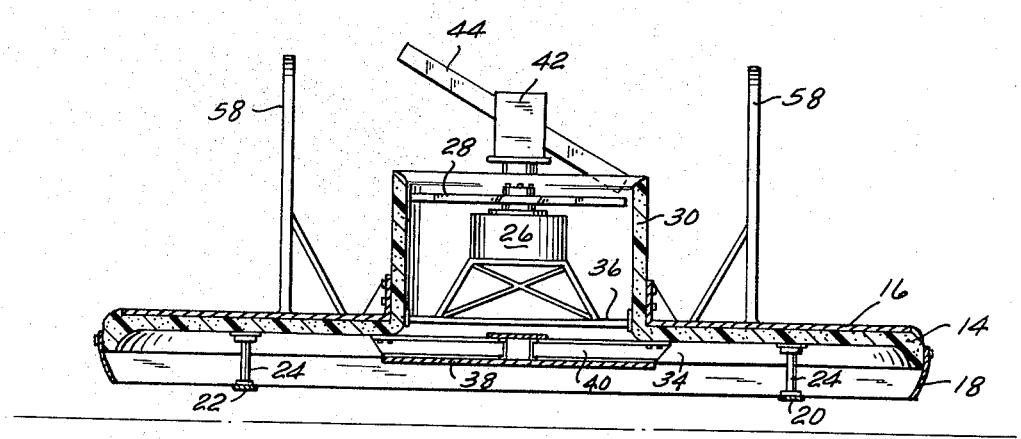
FIG. 4 is a transverse sectional view taken along the line 4—4 of FIG. 1.

In the drawings, the illustrated ground effect machine 10 and associated spraying system 12 cooperate in providing the desired spray pattern of the substance being sprayed. Although a number of spraying and dusting substances are readily handled by this invention, the specific embodiment illustrated herein and the accompanying discussion will be devoted primarily to a liquid such as a liquid insecticide. The craft 10 includes a rigid slab 14 which may be comprised of sheet metal, wood or plastic suitable for such purposes. A polyurethane type of foam material suitably coated with an epoxy material to seal its pores has performed satisfactorily. In this connection, the urethane material is basically light in weight yet structurally sound and, at the same time, may possess sufficient mass to permit the craft to be buoyant when placed on water. The top face of the slab 10 may have a sheet or skin 16 of protective material such as Fiberglas, aluminum or the like to withstand the traffic and the elements to which it would be subjected. The periphery of the slab 14 has suitably anchored thereto a flexible skirt 18 of substantially inverse truncated conical configuration. The skirt material can be selected from a wide range of materials such as parachute material of which Dacron has proven satisfactory. Sailcloth, suitable fabrics, resins and rubbers, both natural and artificial, may also be employed. In those instances where it is desired to park the craft on land, a pair of parking rails 20 and 22 extend in spaced relationship from the bottom of the slab 14 by means of posts 24 suitably bracketed thereto.

The lift characteristics of the craft 10 is provided by a suitably rated lift engine 26 and lift propeller or fan 28 mounted coaxially in an upstanding tubular member 30 open at both ends and defining duct 32 in communication with the plenum 34. The motor 26 may be mounted centrally of the duct 30 by means of a suitable support or truss mounting pad 36 secured to tube 30 and/or the slab 14. As will be appreciated, the tube 30 may be formed of similar lightweight construction suggested for the slab 14. A deflector plate 38 is spaced downwardly from the slab 14 and suitably anchored thereto by means of flanges or angle irons 40. This plate serves to direct the airflow induced by the fan 28, laterally and radially outwardly into the plenum 34.

The maneuverability of the craft 10 in a horizontal direction may be obtained in a number of different ways including the use of a tail thruster as well as one that is adapted to swivel about a vertical axis, rudders, skirt deflection means individually or any combination thereof. In the disclosed embodiment, a swivable tail thruster engine 42 and propeller 44 are utilized to obtain horizontal thrust together with directivity. In this connection, the engine 42, together with its connected propeller 44, are mounted by means of a vertical standard 46 suitably bracketed to the upper face of the slab 14. A suitable pivotal or swivel means 48 is interposed between the standard 46 and engine 42 to obtain the desired movement of the engine about a vertical axis.

In addition, the disclosed embodiment incorporates means for deflecting the skirt 18 to alter the pattern of air flow emerging from beneath the craft. Thus, the skirt 18 at the front, rear and opposing starboard and port sides includes a network of raisers or shroud lines 50. These raisers 50 are connected at one end to the lower edge of the skirt 18 and, at the other end, to a common distortion line 52. Thus, lateral longitudinal movement in any direction is obtained by merely pulling the appropriate distortion line 52 to thereby raise inwardly the adjoining portions of the skirt 18 through the interposed raisers 50. The actual fluid mechanism of the control systems is the shift in the center of pressure under the base of the machine caused by a pulled (inward and upward) skirt thus tilting the machine and its lift vector to provide a side force in the direction of tilt. In this manner, attitude control is obtained by tilting the machine in the direction of the raised zone thus creating a horizontal force and movement in the direction of tilt. Naturally, two or more of the distortion lines 52 may be pulled to obtain a resultant lateral force proportional to the desired horizontal direction of travel. Skirt deflection will, accordingly, permit selective discrete and finite displacements of the craft in a horizontal direction particularly at low speeds. As will be appreciated, the major component of thrust in a horizontal direction is obtained by the rear thrust engine the speed of which governs the magnitude of this thrust which is a variable and adapted to be regulated in the usual manner. For example, as is shown diagrammatically in FIG. 6, the pilot in the cockpit 54 may regulate the speed of the engine 42 and the direction of the axis and thrust of the propeller 44. In a similar manner, the distortion lines 52 may eventually lead to the cockpit 54 by means of a guide and pulley network (not shown) whereby the pilot may advantageously execute skirt deflection.

A pair of opposed stabilizers 58 may be mounted as shown to provide the usual stabilizing effect. These stabilizers may be equipped with rudders (not shown) to supplement directivity and control of the craft 10 at the discretion of the pilot. Naturally, suitable automatic gyro and servo mechanisms may be employed to obtain the desired deflection of the skirt 18 and swiveling of the rear thrust propeller 44 as well as these rudders.

The cockpit 54 may include one or more seats 60 for the pilot and desired complement of passengers or crew. A suitable forward shield 62 may be rigidly anchored to the forward part of the slab 14 and may be constructed of a suitable Plexiglas or other transparent material. Of course, the cockpit will include the necessary number of controls including rudder pedals for controlling the direction of rear thrust propeller 44 and the wheel mechanism 64 for pulling the individual distortion guide lines 52 individually and collectively. In addition, the mechanism for starting and increasing the r.p.m. of both engines 26 and 42 may be included within the reach of the pilot.

In dispensing the selected spray material into the air stream discharged from the plenum 34, one of a number of systems may be employed whether gravitational or independently powered. The latter is somewhat preferred and an exemplary embodiment thereof is illustrated in the drawings. Thus, the spray applicator system 12 includes an array 70 of liquid discharge nozzles located slightly forward of the deflection plate 38 but at a location at which the discharged liquid is readily picked up by the air stream. Although the illustrated configuration and arrangement of the nozzle array 70 has proven satisfactory, other arrangements are readily adaptable including a completely circular array disposed about the deflection plate 38 or an array concentric with the axis of the slab 14 or skirt 18. The supply of the liquid to be sprayed may be in the form of one or more drums 72 strapped or otherwise anchored to the slab 14. The quantity and flow characteristics of the liquid to be sprayed from the nozzle 70 may be regulated by a suitably interposed valve 74 under the control of the pilot. A suitably rated hydraulic pump 76 may be employed to generate the desired or necessary hydraulic pressure.

It will now be evident that the ground effect machine 10 is advantageously equipped for agricultural applications particularly as a duster-sprayer of insecticides. The craft during operation is supported above the ground or water, as the case may be, by a cushion of air. This distance is a function of the size, loading and power of the craft and generally high enough to clear many important crops. The ground clearance of the craft 10 can be expressed as a percentage of its diameter. For the low base pressures required for agricultural applications, this ground clearance may be as high as ten percent of the diameter. The downwash from the craft is remarkably gentle enough not to damage a large number of crops and, at the same time, turbulent enough to mix the insecticide with the underside as well as the top of the plants. The basic cost of the craft equipped and its operating costs are highly favorable for the contemplated agricultural applications. The inherent safety and good maneuverability and relatively high speed potential of the craft are also major contributing factors for this application. Controlled distribution of the desired concentration of the insecticide with optimum precision and with minimum time expenditure over swamp areas as well as hard lands is of paramount importance.

Specific exemplary applications of the present invention reside in the treatment of farm lands prior to planting generally undertaken for wheat and corn producing lands. Small grain producing lands and young cornfields are also peculiarly suited for applications by the present invention. Other uniquely suited applications includes spraying of cranberry and potato plant fields. In the case of cranberries, fungicide treatment may also be in order whereas in the case of potatoes, an insecticide treatment may be employed. Liquid nitrogen and liquid fertilizers in general may obviously be effectively sprayed. Of course, the contemplated application of the present invention embraces insecticide and pesticide controls included in which is mosquito control. In view of the outwash from the craft, the spray will ordinarily cover a path somewhat wider than the width or diameter of the machine. In those instances where toxic materials are to be sprayed or handled by the craft, a new cockpit enclosure could be incorporated into the structure which would be airtight and equipped with an air-conditioning and ventilating system.

Other spraying techniques employing the basic ground effect machine 10 are envisioned by the present invention in addition to the preferred technique employing the natural flow of air beneath the machine for the air distribution of the material to be sprayed. With this in mind, external chemical distribution devices such as a horizontal spraying boom and nozzle arrangement may be incorporated into the machine 10.

Thus, the ground effect machine 10 of the present invention does possess optimum potential and utility in the agricultural and related spraying fields. This is due to its light base loading, low initial jet velocity, high obstacle clearance capability, good static stability and excellent controll and maneuverability characteristics. The craft's capability of operating at reasonably high speeds is an extreme advantage. Upwards of about 35 to 40 miles per hour as attainable as well as lower speeds down to a hovering condition. It can, in hover, turn about its vertical axis making possible right angle flight paths without experiencing any difficulty.

The several aforenoted objects and advantages are clearly most effectively attained. Although a single somewhat preferred embodiment of this invention has been disclosed and described in detail herein, it should be understood that this invention is in no sense limited thereby and its scope is to be determined by that of the appended claims.

We claim:

1. A ground effect machine comprising: a substantially horizontal and rigid generally flat and circular slab having a circular opening therein and having a front, rear and starboard and port sides; a flexible skirt extending completely around the periphery of said slab and being anchored thereto and depending downwardly therefrom, said skirt generally defining an inverse truncated conical configuration; said skirt and said slab defining a plenum; a substantially horizontal and circular deflection plate within said plenum in substantial concentric relationship with respect to said circular opening in said slab, said deflection plate being connected to the underside of said slab and in spaced relationship relative thereto, the periphery of the plate being spaced inwardly from the skirt to define a peripheral annular opening therebetween; a substantially tubular lift propeller duct extending upwardly from said slab and aligned with the opening therein; a lift engine and propeller assembly mounted in the duct and when operated is adapted to cause air to be ingested downwardly through the duct, such ingested air is then adapted to be deflected by the deflection plate in a horizontal and radially outwardly direction and then downwardly through the peripheral opening, such air efflux from the peripheral opening is adapted to impinge upon the ground producing a cushion pressure beneath the ground effect machine and a simultaneous jet efflux radially outwardly from beneath the ground effect machine to thereby cause the ground effect machine to lift off of the ground; a swivable thrust engine and propeller assembly located at the rear of and above said slab and adapted to pivot about a vertical axis whereupon a substantially horizontal thrust is produced by the thrust assembly when operated to thereby cause the ground effect machine to be driven in a horizontal direction opposite the thrust and at a speed proportional to the thrust; peripheral skirt raiser means at each of the front, rear, starboard side and port side of the skirt for selectively raising and lowering the skirt at one or more of such locations to thereby cause lateral movements of the ground effect machine proportional to and in the direction of the tilt of the ground effect machine; a cockpit on the slab for receiving a pilot; and control means proximate said cockpit and operable by the pilot for controlling the operation of engines and the direction of thrust of the machine produced by thrust assembly and the lateral movement of the machine produced by the raiser means by raising and lowering of the skirt.

2. The invention in accordance with claim 1 wherein parking rails extend downwardly from the slab and are disposed below the deflection plate to permit the ground effect machine to rest on the parking rails.

3. The invention in accordance with claim 1 wherein the rigid slab is formed from lightweight porous resinous material adapted to increase the buoyancy of the ground effect machine.

4. The invention in accordance with claim 1 wherein at least one stabilizer extends upwardly from the slab for stabilizing the ground effect machine during flight.

5. The invention in accordance with claim 1 wherein a dispensing system is included on said craft for introducing a substance to be dispensed into the air stream traveling between the said ingested air and the peripheral jet efflux.

6. The invention in accordance with claim 5 wherein the dispensing system is a liquid spraying system which comprises a nozzle means located in said plenum for introducing the liquid to be sprayed into the air streams, said nozzle means being coupled with a supply of the liquid to be sprayed, said supply including at least one tank mounted by the slab for containing the liquid to be sprayed, a pump means interposed between the liquid supply and nozzle for pumping the liquid from the supply to the nozzle means and outwardly therefrom in accordance with the selected spray pattern and valve means also interposed between the liquid supply and nozzle for cooperating in arriving at the selected liquid spray pattern.

7. A system for agricultural spraying, dusting or the like applications comprising in combination: a ground effect machine having means for causing air stream to be ingested therethrough and effluxed therefrom in a manner to produce a component of lift causing the machine to lift off of the ground; a dispensing means for the substance to be dispensed in the agricultural spraying, dusting or the like applications, said dispensing means having a dispensing outlet adapted to release the substance into the air stream to be ultimately uniformly applied with the air effluxed from the machine, the substance ladened efflux being gentle to keep crops from being damaged thereby and sufficiently turbulent to mix the discharged substance uniformly in the air stream and apply it to the underside of plants, the entire plant structure and the underlying soil.

8. A system for agricultural spraying, dusting or the like applications comprising in combination: a ground effect machine having means for causing air stream to be ingested therethrough and effluxed therefrom in a manner to produce a component of lift causing the machine to lift off of the ground; maneuvering means for maneuvering the ground effect machine in substantially any horizontal direction at selected speeds down to a hovering condition; a dispensing means for the substance to be dispensed in the agricultural spraying, dusting or the like applications, said dispensing means having a dispensing outlet adapted to release the substance into the air stream to be ultimately uniformly applied with the air effluxed from the machine, the substance ladened efflux being gentle to keep crops from being damaged thereby and sufficiently turbulent to mix the discharged substance uniformly in the air stream and apply it to the underside of plants, the entire plant structure and the underlying soil.

9. A system for agricultural spraying comprising in combination: a ground effect machine having means for causing air stream to be ingested therethrough and effluxed therefrom in a manner to produce a component of lift causing the machine to lift off of the ground; maneuvering means for maneuvering the ground effect machine in substantially any horizontal direction at selected speeds down to a hovering condition; a dispensing means for the substance to be dispensed in the agricultural spraying, said dispensing means having a dispensing outlet adapted to release the substance into the air stream to be ultimately uniformly applied with the air effluxed from the machine, the substance ladened efflux being gentle to keep crops from being damaged thereby and sufficiently turbulent to mix the discharged substance uniformly in the air stream and apply it to the underside of plants, the entire plant structure and the underlying soil, the substance to be sprayed is a liquid and the dispensing outlet is in the form of a nozzle means within the ground effect machine for discharging the liquid into the air stream, the dispensing means also including at least one tank for supplying the liquid to be sprayed, a pump means for pumping the liquid to be sprayed from the tank to the nozzle means to thereby produce a predetermined rate of discharge of the liquid to be sprayed into the air stream, and valve means interposed between the tank and nozzle means for cooperating in controlling the spray pattern of the liquid produced by the ground effect machine during flight.

10. A method of spraying, dusting or the like a substance to be applied over selected terrain, operating a ground effect machine to thereby generate an air stream which is effluxed from the machine in a manner to produce a component of lift to cause the machine to lift off the ground, dispensing the substance to be applied into the air stream so that it will be ultimately applied over the selected terrain with the air effluxed from the machine, the substance ladened efflux being gentle to keep crops from being damaged thereby and sufficiently turbulent to mix the discharged substance uniformly with the air stream and apply it to the underside of plants, the entire plant structure and the underlying soil of the selected terrain.

11. A method of spraying, dusting or the like a substance to be applied over selected terrain, operating a ground effect machine to thereby generate an air stream which is effluxed from the machine in a manner to produce a component of lift to cause the machine to lift off the ground, dispensing the substance to be applied into the air stream so that it will be ultimately applied over the selected terrain with the air effluxed from the machine, the substance ladened efflux being gentle to keep crops from being damaged thereby and sufficiently turbulent to mix the discharged substance uniformly with the air stream and apply it to the underside of plants, the entire plant structure and the underlying soil of the selected terrain, maneuvering the ground effect machine in flight to cover the selected terrain and apply the substance uniformly thereover.

12. A method of spraying, dusting or the like a liquid substance to be applied over selected terrain, operating a ground effect machine to thereby generate an air stream which is effluxed from the machine in a manner to produce a component of lift to cause the machine to lift off the ground, dispensing the liquid substance to be applied into the air stream so that it will be ultimately applied over the selected terrain with the air effluxed from the machine, controlling the rate of discharge of the liquid substance into the air stream, the liquid substance ladened efflux being gentle to keep crops from being damaged thereby and sufficiently turbulent to mix the discharged liquid substance uniformly with the air stream and apply it to the underside of plants, the entire plant structure and the underlying soil of the selected terrain, maneuvering the ground effect machine in flight to cover the selected terrain and apply the substance uniformly thereover.

13. A method of spraying, dusting or the like a substance to be applied over selected terrain, operating a ground effect machine to thereby generate an air stream which is effluxed from the machine in a manner to produce a component of lift to cause the machine to lift off the ground, dispensing this substance to be applied so that it will be ultimately applied over the selected terrain, said efflux being gentle to keep the crops from being damaged, and maneuvering the ground effect machine in flight to cover the selected terrain and apply the substance uniformly thereover.

14. A system for agricultural spraying, dusting or the like applications comprising in combination: a ground effect machine having means for causing an air stream to be ingested therethrough and effluxed therefrom in a manner to produce a component of lift causing the machine to lift off the ground, maneuvering means for maneuvering the ground effect machine in substantially any horizontal direction at selected speeds down to hovering conditions; a dispensing means for the substance to be dispensed in the agricultural spraying, dusting or the like applications, said dispensing means having a dispensing outlet adapted to release the substance to be ultimately uniformly applied from the machine, the efflux being gentle to keep crops from being damaged thereby.

No references cited.

EVERETT W. KIRBY, *Primary Examiner.*